United States Patent [19]
Webb et al.

[11] Patent Number: 4,789,517
[45] Date of Patent: Dec. 6, 1988

[54] ROTATING BUBBLE MEMBRANE RADIATOR

[75] Inventors: Brent J. Webb; Edmund P. Coomes, both of West Richland, Wash.

[73] Assignee: The United States of America as represented by the United States Department of Energy, Washington, D.C.

[21] Appl. No.: 62,876

[22] Filed: Jun. 15, 1987

[51] Int. Cl.$^4$ .............................................. G21C 15/18
[52] U.S. Cl. ..................................... 376/299; 126/443; 165/86; 376/317; 376/402; 376/909; 376/910
[58] Field of Search ..................... 126/443; 165/41, 86; 244/158 A, 159; 376/299, 317, 402, 909, 910

[56] References Cited

U.S. PATENT DOCUMENTS 3,377,251  4/1968  Hanthorn et al. .................. 376/910
4,237,868 12/1980  Overton ............................. 126/443

OTHER PUBLICATIONS

The Pegasus Drive: a Multimegawatt Nuclear Electric Propulsion System and Pegasus! a Multi-Megawatt Nuclear Electric Propulsion System, May 1986, DE-AC06-76RL01830.

*Primary Examiner*—Charles T. Jordan
*Assistant Examiner*—Richard W. Wendtland
*Attorney, Agent, or Firm*—Edward V. Hiskes; Robert Southworth, III

[57] ABSTRACT

A heat radiator useful for expelling waste heat from a power generating system aboard a space vehicle is disclosed. Liquid to be cooled is passed to the interior of a rotating bubble membrane radiator, where it is sprayed into the interior of the bubble. Liquid impacting upon the interior surface of the bubble is cooled and the heat radiated from the outer surface of the membrane. Cooled liquid is collected by the action of centrifical force about the equator of the rotating membrane and returned to the power system. Details regarding a complete space power system employing the radiator are given.

6 Claims, 3 Drawing Sheets

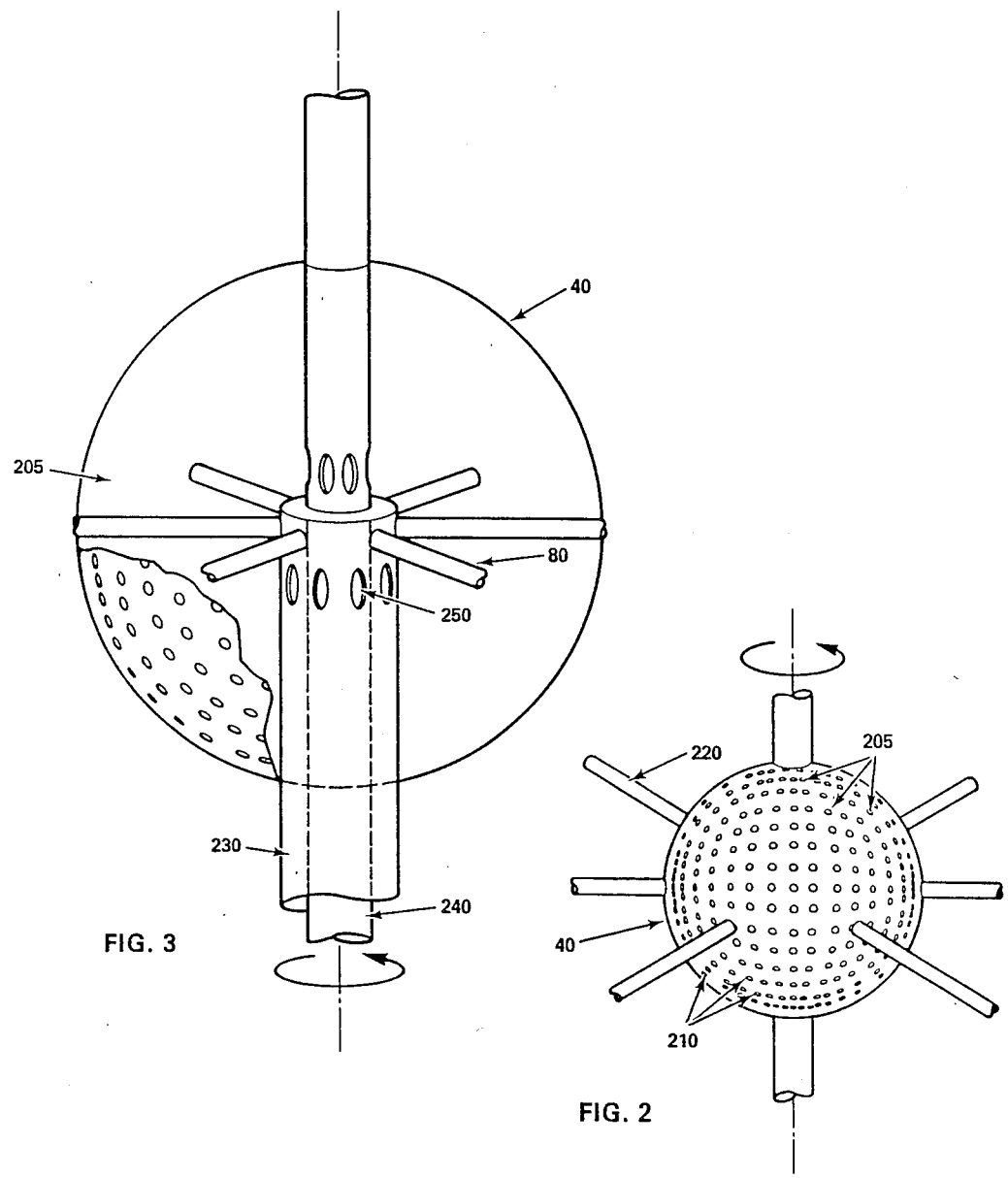

ROTATING BUBBLE MEMBRANE RADIATOR

GOVERNMENT CONTRACT

This invention was made or conceived in the course of or under a contract with the United States Department of Energy.

BACKGROUND OF THE INVENTION

This invention relates in general to devices which remove waste heat from power generating or other systems, and in particular to means for removing heat from liquids employed in systems located in space.

A device for rejecting waste heat in space must meet special requirements. Since transportation from earth to space is expensive, such a device must provide maximum heat rejection per unit of device weight. Furthermore, since space is a weightless environment, liquids must be made to flow by means other than gravity. In addition, since space is a vacuum, conductive or convective modes for cooling are not available for ultimate disposal of the heat into the space environment.

OBJECTS OF THE INVENTION

Thus, it is one object of the present invention to provide a heat rejection device for use in space which is isothermal, lightweight and compact relative to its heat rejection capability.

It is a further object of this invention to provide a device which can efficiently handle and condense two phase fluids under the weightless and vacuum conditions of space.

These and other objects are achieved in a device wherein a two phase fluid is sprayed upon the inner surface of a hollow, rotating spherical membrane radiator. Heat leaves the condensed liquid by radiation from the outer surface of the sphere. Rotation causes the condensed liquid to collect at defined points on the inner surface of the sphere where it can be captured and returned to the fluid circuit.

Additional objects, advantages, and novel features of the invention will be set forth in part in the description which follows, and in part will become apparent to those skilled in the art upon examination of the following. The objects and advantages of the invention may be realized and attained by means of the instrumentalities and combinations particularly pointed out in the appended claims.

SUMMARY OF THE INVENTION

The Rotating Bubble Membrane Radiator is an integral condenser and isothermal heat rejection system which comprises a hollow sphere and sphere rotation means. Fluid lines convey hot two phase fluid to a spray nozzle inside the spherical bubble membrane. Sprayed two phase fluid condenses upon the inner surface of the rotating sphere and is cooled as heat passes to the outside of the sphere. The heat is radiated into space. Rotational forces cause condensed liquid to collect in a depression located on the inner surface of the sphere. Pumps return cooled liquid from the collection troughs to the fluid circuit from which it came.

It is an advantage of this design, that the radiator system operates in an isothermal two phase mode resulting in higher surface heat fluxes, producing overall system benefits in system mass and volume savings. We estimate that this will result in a two phase isothermal heat rejection system equivalent to a single-phase system, but with one-fourth the fluid mass and one-twentieth the mass flow requirements for the same operating temperatures.

BRIEF DESCRIPTION OF THE DRAWINGS

FIG. 2 is a diagram of a combined spray nozzle and drain device suitable for use within the bubble radiator.

FIG. 3 is a view of device of FIG. 2 with much of surface is cut away.

DESCRIPTION OF THE PREFERRED EMBODIMENT

Figure 1:
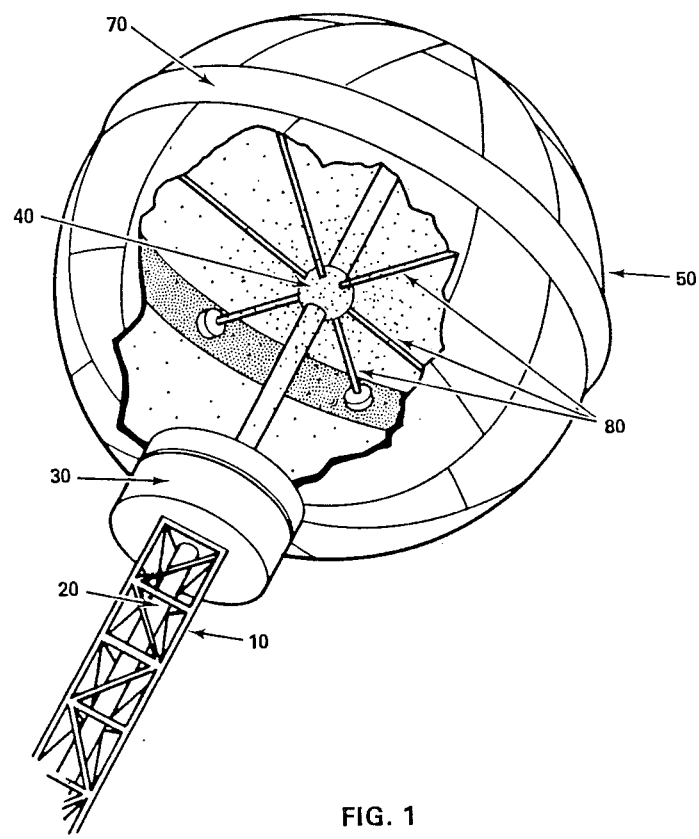
FIG. 1 is a view of bubble radiator attached to a space platform with boom. A portion of the outer radiating membrane is cut away to reveal internal structures.

As seen in FIG. 1, the bubble membrane radiator system is attached to a space platform by means of attachment boom 10.

Liquid and vapor to be cooled are conveyed to the radiator under pressure by means of feed/return line 20 located within boom 10. Line 20 may consist of two separate pipes, one for hot fluid about to enter the radiator system, and another for cooled fluid leaving the system. The fluid in line 20 passes through platform 30 through the center of hollow central rotation shaft 30 to nozzle array 40 Then the fluid and vapor are emitted as a spray from nozzle array 40.

Nozzle array 40 may be any suitable means for forming the fluid in line 20 into droplets and spraying it over a wide angle. In the embodiment of FIG. 1, nozzle array 40 comprises a hollow spheroid into which fluid is injected. Numerous small openings in the surface of the spheroid act as nozzles which spray the heated liquid over a wide angle.

The spray from combined nozzle and drain device 40 is emitted into the envelope of spherical bubble membrane radiator 50. Within this envelope, both convective and radiant heat transfer occurs between &he droplets, &he vapor, and the membrane. As the droplets forming the spray move radially outward, they grow by condensation of the vapor upon their surfaces and by contact with other droplets. After impacting upon the inner surface of membrane 50, the fluid flows toward the equator of membrane 50 due to rotation-induced artificial gravity.

Membrane 50 is maintained in a state of continuous rotation by rotation means, for example a motor, which may be located on rotation platform 30. This rotation causes liquid impacting upon radiator 50 to accumulate in depression 70, a trough, located at the equator of membrane 50. Alternatively, the entire space platform can be rotated at a speed sufficient to supply the required artificial gravity. In this case, special rotation means associated with the radiator system would not be required.

Collected fluid in trough 70 is conveyed to line 20 by way of the hollow centers of spokes 80. The fluid may be caused to flow out of the trough and into spokes 80 and line 20 by means of pumps located aboard the space platform or elsewhere in the fluid circuit. Thus, spokes 80 provide both a fluid return path and means for structural support of membrane 50.

It is an advantage of this design, that the radiator system operates in an isothermal two phase mode resulting in higher surface heat fluxes, producing overall system benefits in system mass and volume savings. We estimate that this will result in a two phase isothermal heat rejection system equivalent to a single-phase system, but with one-fourth the fluid mass and one-twentieth the mass flow requirements for the same operating temperatures.

Membrane 50 may be constructed by any thin, structural material which conducts heat and which is otherwise suitable for use in space. However, a radiator system intended for long life in space, on the order of several years, should be designed using materials which can survive impact from micro-meteoroid and space debris. Prime candidate materials for the thin film membrane of membrane 50 include fiber and metallic alloy cloths, carbon-epoxy materials, silica based materials, silicon carbide cloths with metallic liners, and niobium-tungsten composites. Suitable materials are described in Sawko, "Flexible Thermal Protection Materials", NASA Conference Publication 2315 (1983).

A method for determining the size of membrane 50 is given in the following example, which assumes that thermoelectric reactor for use aboard the space platform has a power output of 100 KW electrical and a waste heat load of 1 MW.

The assumption made for this example are:

| | | |
|---|---|---|
| Electric Output Power (P) | 200 KWe | |
| Waste Heat to Reject (Qr) | 1.01 MW | |
| Radiator Temperature (Tr) | 775K | (935 F.) |
| Temperature of Space (Ts) | 0° K. | (−453° F.) |
| Emissivity of Radiator | .9 | |
| Stefan-Boltzman Constant | 5.67E-8 W/m2-K4 | |
| Percent Error introduced by Solar and Earth Radiation | 5% | |

Then, the area of the radiating surface for the heat load may be calculated as follows:

Area=1.05 * Qr/(0.9 * 5.67E−8 * (Tr4− $T_{s4}$))m2

Area=57.18 m2 (meters squared)

Radius of Sphere=2.13 m

FIG. 2 is a diagram of combined spray nozzle and drain device 40. This device is suitable for applying liquid to and retrieving liquid from the bubble membrane.

Surface 205 is provided with numerous holes 210 through which liquid to be cooled is ejected under pressure. After ejection liquid droplets travel from the center of the enclosed membrane volume toward the membrane itself.

The droplets impact on the membrane, and are thereby cooled. Condensate liquid accumulating on the membrane is collected by drain spokes 220 which extend from collection troughs on the membrane equator through surface 205.

FIG. 3 is a view of device 40 with much of surface 205 cut away. Drain spokes 80 are shown connected to return flow line 230, which is concentric with inlet flow line 240. Hot two phase fluid to be cooled enters the interior of device 40 from inlet line 240 by means of inlet ports 250, which penetrate the return flow line.

Figure 4:
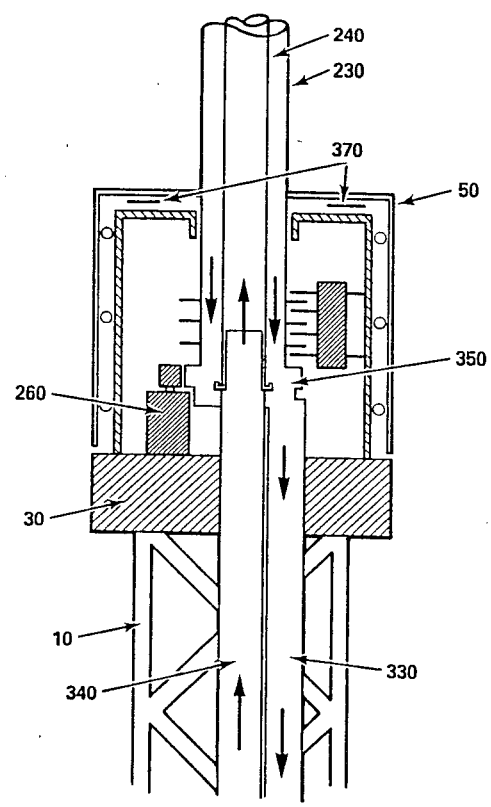
FIG. 4 is a schematic of the mechanisms responsible for rotating the bubble membrane and attaching it a boom.

FIG. 4 is a schematic of the mechanisms responsible for rotating the bubble membrane and attaching it to boom 10.

Stationary inlet and outlet flow lines 340 and 330 are shown passing through non-rotating platform 30. These fluid lines are coupled to rotating lines 240 and 230 within the membrane by means of rotating fluid coupling 350. These rotating lines together with membrane 50 are given rotary motion by electric drive and gearing unit 260, and are physically supported by thrust bearings 370 and roller bearings 380.

The foregoing description of a preferred embodiment of the invention has been presented for purposes of illustration and description. It is not intended to be exclusive or to limit the invention to the precise form disclosed, and obviously many modifications and variations are possible in light of the above teaching. It is intended that the scope of the invention be determined by the claims appended hereto.

The articles entitled "*The Pegasus Drive: A Multimegawatt Nuclear Electric Propulsion System*" and "*Pegasus: A Multi-Megawatt Nuclear Electric Propulsion System*" are incorporated into this specification as appendices A and B respectively.

What we claim is:

1. A radiator system for removing waste heat in two phase fluids, suitable for use in space, comprising a rotating heat conductive membrane enclosing a volume which volume possesses an inner surface and an outer surface, the outer surface being capable of radiating heat; means for applying two phase fluid to be condensed to said inner surface; and means for collecting condensate fluid from said inner surface.

2. The radiator system of claim 1 wherein said means for applying fluid comprises nozzle means located within said enclosed volume for spraying said two phase fluid toward said inner surface.

3. The radiator system of claim 2 wherein said heat conductive membrane comprises a depression for collection of condensate.

4. A method for removing waste heat from two phase fluids in space comprising the steps of: rotating a membrane which encloses a volume, said membrane having an outer surface and an inner surface; spraying two phase fluid which condenses upon the inner surface of a said membrane; collecting condensed liquid from the inner surface of said membrane; and radiating heat under isothermal conditions from said membrane surface.

5. The method of claim 4 wherein said spraying is accomplished through the use of nozzles located with said volume.

6. The method of claim 5 wherein said collecting is accomplished through the use of troughs located upon the equator of said rotating membrane.

* * * * *